March 24, 1953     W. L. HANFORD     2,632,164
FOLDABLE EYESHADE
Filed March 8, 1951

Inventor
W. L. HANFORD
By Arthur H. Sturges
Attorney

Patented Mar. 24, 1953

2,632,164

UNITED STATES PATENT OFFICE 2,632,164

FOLDABLE EYESHADE

Walter L. Hanford, Omaha, Nebr.

Application March 8, 1951, Serial No. 214,460

2 Claims. (Cl. 2—12)

This invention relates to eye shades adapted for general use and particularly for use by golfers, athletes, and the like where accurate positioning of the visor is essential, and in particular this invention relates to an improved eye shade which is provided with adjusting means for regulating the position of the visor vertically and which also includes means for adjusting the distance of the inner rim of the visor from the forehead of the wearer.

In addition to the adjusting means the invention also includes means for folding the parts of the eye shade to facilitate carrying the shade in a pocket, handbag or the like.

The purpose of this invention is to provide adjusting elements in an eye shade so that ventilation may be provided between the inner rim of the shade and forehead of a wearer of the shade, and also so that the position of the visor may be adjusted in relation to the rays of the sun or to glare rays from lights and the like.

In the conventional type of eye shade or sun visor it is difficult to adjust the position of the visor to compensate for the changing position of the sun, and with the inner rim of the visor fitted snugly against the forehead of a wearer perspiration accumulates around the rim and often runs over the visor. For this reason eye shades are not used universally. Furthermore eye shades are only desired at certain times and as they are difficult to carry they are not available when use thereof is essential.

With these thoughts in mind this invention contemplates an improved type of eye shade in which a visor is provided with an inner rim of substantial thickness and bows which are hinged in the rim are clamped against the sides of a head by thumb screws, and also in which means is provided for adjustably supporting the visor from the nose of a wearer of the shade.

The object of this invention is, therefore, to provide means for constructing an eye shade so that bows thereof which swing inwardly to folded positions are adjustably held.

Another object of the invention is to provide means for adjustably supporting an eye shade from the nose of a wearer of the shade.

Another object of the invention is to provide an eye shade that is adapted to be folded for carrying in a pocket, handbag, or the like.

A further object of the invention is to provide means for holding the inner rim of an eye shade away from the forehead of a wearer of the shade for the purpose of providing ventilation under the shade.

A still further object of the invention is to provide an eye shade having hinged mounting elements with thumb screws for adjusting the positions of the mounting elements which is of a simple and economical construction.

With these and other objects and advantages in view the invention embodies a visor having an arcuate rim with bows hinged to the ends of the rim and a nose support hinged to the rim at the center of the visor in which the positions of the nose support and bows are controlled by thumb screws.

Other features and advantages of the invention will appear from the following description taken in connection with the drawings, wherein.

Figure 1:
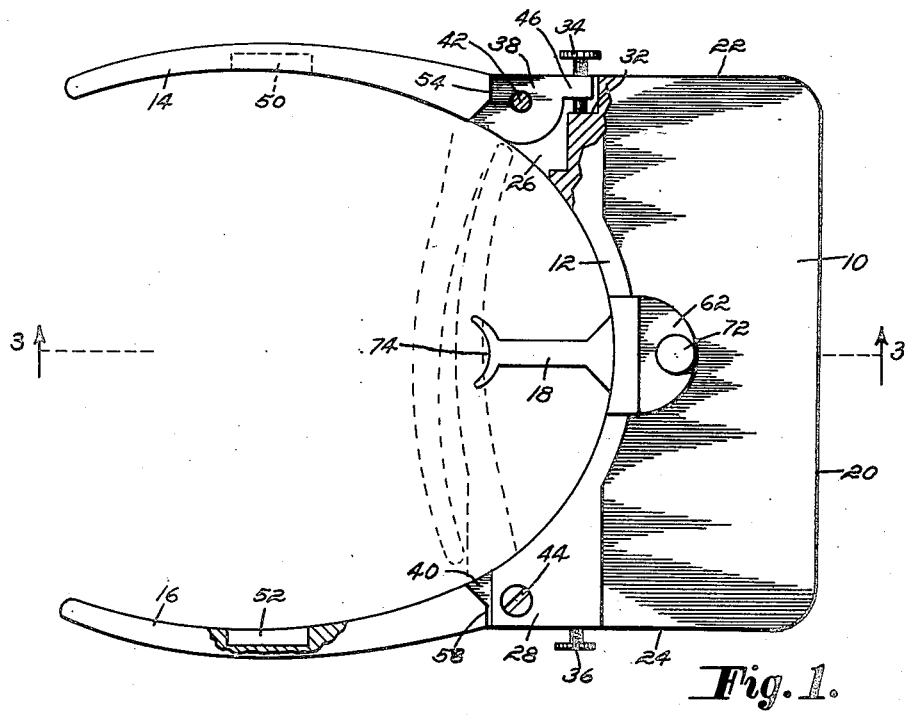
Figure 1 is a plan view of the improved eye shade with parts broken away and shown in section, and with the bows shown in folded positions in dotted lines.

Referring now to the drawings wherein like reference characters denote corresponding parts the improved adjustable eye shade of this invention is formed with a visor 10 having a rim 12, with bows 14 and 16 hinged to the ends of the rim, and a nose support 18 which extends downwardly from the under surface of the rim.

The visor 10, which is formed of a suitable plastic, is preferably rectangular-shape in plan having an outer edge 20 and ends 22 and 24, and the inner edge is reinforced or thickened to form the rim 12 which is considerably thicker than the visor. With the upper edge of the rim extended upwardly above the upper surface of the visor it provides a shade protecting a greater portion of the forehead of a wearer of the eye shade from the rays of the sun, and also provides means for accelerating the circulation of air between the visor and forehead to facilitate ventilation.

Each end of the rim is provided with a slot 26 providing upper extensions 28 and lower extensions 30 and the bases of the slots are stepped to provide shoulders 32 against which the inner ends of thumb screws 34 and 36 are positioned, as shown in the broken away portion of Figure 1.

Figure 2:
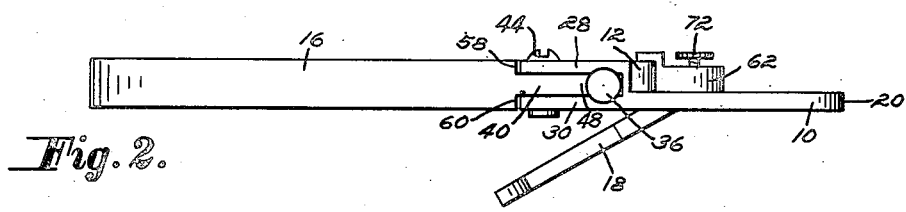
Figure 2 is a side elevational view of the eye shade.
Figure 3:
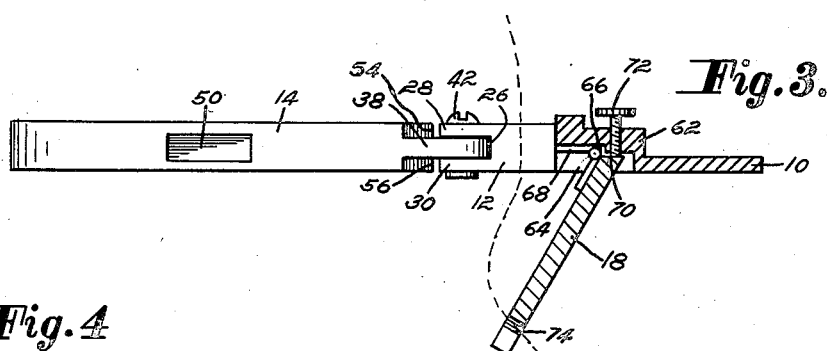
Figure 3 is a longitudinal section through the eye shade taken on line 3—3 of Figure 1.

The bows 14 and 16 are provided with tongues 38 and 40, respectively, and the tongues dovetail between the extensions as shown in Figures 2 and 3. The bow 14 is pivotally mounted in the end of the rim 12 by a pin 42, and the bow 16 is similarly mounted in the opposite end of the rim by a pin 44. The pins extend through the extensions at the ends of the rim and through the tongues of the bows, and the ends of the pins may be provided with screw heads with screw driver slots therein, and also with nuts as shown in the drawing, or pins or rivets of any suitable type or design may be used.

The tongues of the bows 14 and 16 are provided with extensions 46 and 48 in which the thumb screws 34 and 36 are threaded, and the inner surfaces of the bows are provided with recesses 50 and 52 that are positioned to receive the extended end of the nose support 18 with the bows folded to the positions shown in dotted lines in Figure 1. The upper and lower edges of the bow 14 are provided with shoulders 54 and 56 that engage the edges of the extensions at the end of the rim to coact with the thumb screw 34 to limit outward movement of the bow and the bow 16 is provided with similar shoulders 58 and 60 that are positioned to engage the edges of the extensions on the opposite end of the rim for the same purpose.

Figure 4:
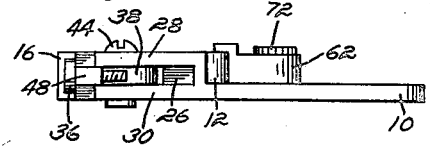
Figure 4 is a side elevational view of the eye shade, similar to that shown in Figure 2, and showing the bows folded.

The intermediate part of the visor is provided with a boss 62 having a recess 64 in the under surface and the boss is provided with a stepped under surface forming a shoulder 66 in the ceiling of the recess. The nose support 18 is mounted in the recess 64 by a hinge 68 and an upper beveled end surface 70 of the support is positioned to engage the inner end of a thumb screw 72 which is threaded in the boss 62, as shown in Figure 3. The lower end of the support is provided with a fork having an arcuate inner surface 74 that contacts the nose. This fork is positioned to extend into one of the recesses 50 or 52 of the bows whereby the nose support is retained in a position parallel to the visor when the parts are folded, as shown in Figure 4.

With the parts assembled in this manner the improved eye shade or sun visor may be collapsed or folded to provide a comparatively small or compact package whereby it may be carried in a pocket, handbag, or the like, and when it is desired to use the device the nose support 18 is moved downwardly and the bows 14 and 16 outwardly. By turning the thumb screws 34 and 36 the bows are opened sufficiently to receive the head of a wearer of the shade and after the bows are in position on the sides of the head the thumb screws are tightened until the bows are in comfortable engagement with the sides of the head, whereby the shade is supported with the inner surface of the rim spaced the desired distance from the forehead to provide ventilation.

With the eye shade in position the thumb screw 72 is adjusted whereby the visor is raised or lowered to compensate for the position of the sun or other light from which objectionable glare rays are received.

The improved eye shade of this invention may be provided in different colors and formed of suitable light weight material.

From the foregoing description it is thought to be obvious that a foldable eye shade constructed in accordance with my invention is particularly well adapted for use by reason of the convenience and facility with which it may be assembled and adjusted, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

Having thus fully described the invention what I claim as new and desire to secure by Letters Patent, is:

1. An adjustable eye shade comprising a visor having an arcuate rim on the inner edge, the thickness of said rim being greater than that of the visor providing a boss extended upwardly above the upper surface of the visor, bows pivotally mounted in the ends of the rim and positioned to fold to positions within the ends of the rim, said rim having a recess in the under surface, a nose support hinged at one side to the under surface of the rim and positioned with the hinged end thereof in the said recess, said nose support having an extended upper end surface, a thumb screw threaded in the rim and positioned to engage the upper end surface of the nose support for adjusting the position of the nose support, and thumb screws threaded in the bows for adjusting the positions of the said bows.

2. In an adjustable eye shade, the combination which comprises a visor having an arcuate rim forming the inner edge, said rim extended upwardly above the upper surface of the visor providing an arcuate boss, and having horizontally disposed slots in the ends and a centrally disposed recess in the under surface, arcuate bows having recesses in the inner surfaces, tongues on the ends extended toward the rim of the visor, and extensions on the ends of the tongues, said tongues and extensions thereof positioned in the slots in the ends of the rim of the visor, pins extended through the said tongues and ends of the rim of the visor pivotally mounting the bows in the rim, a nose support extended from the recess in the under surface of the rim and hinged to the said rim, said nose support having a fork on the lower end, and thumb screws in the extensions of the tongues and arcuate boss of the rim for adjusting the positions of the bows and nose support, respectively.

WALTER L. HANFORD.

REFERENCES CITED

The following references are of record in the file of this patent:

UNITED STATES PATENTS

| Number | Name | Date |
| --- | --- | --- |
| 1,255,430 | King | Feb. 5, 1918 |
| 1,953,791 | Wickland | Apr. 3, 1934 |
| 2,337,866 | Boughton et al. | Dec. 28, 1943 |
| 2,530,881 | Houston | Nov. 21, 1950 |